US005908905A

United States Patent [19]

Nakano et al.

[11] Patent Number: 5,908,905

[45] Date of Patent: Jun. 1, 1999

[54] POLYMERIZATION OF VINYL CHLORIDE WITH T-BUTYL PEROXYNEOHEPTANOATE AND PERESTER PEROXIDE

[75] Inventors: Toshihiko Nakano; Tadashi Amano, both of Kamisu-machi, Japan

[73] Assignee: Shin-Etsu Chemical Co., Ltd., Tokyo, Japan

[21] Appl. No.: 08/754,167

[22] Filed: Nov. 22, 1996

[30] Foreign Application Priority Data

Nov. 22, 1995 [JP] Japan .................................... 7-328014

[51] Int. Cl.$^{6}$ .................................................. C08F 4/38

[52] U.S. Cl. ........................................ 526/228; 526/344.2

[58] Field of Search ............................................... 526/228

[56] References Cited

U.S. PATENT DOCUMENTS

| | | | |
|---|---|---|---|
| 4,914,169 | 4/1990 | Suyama | 526/228 |
| 5,357,011 | 10/1994 | Ohnishi | 526/228 |
| 5,362,828 | 11/1994 | Fujiwara | 526/228 |
| 5,378,781 | 1/1995 | Fujiwara | 526/228 |

*Primary Examiner*—Christopher Henderson

*Attorney, Agent, or Firm*—Oblon, Spivak, McClelland, Maier & Neustadt, P.C.

[57] ABSTRACT

There is provided a process of producing a vinyl chloride polymer wherein vinyl chloride monomer or a monomeric mixture containing vinyl chloride monomer is suspension polymerized in the presence of an oil-soluble polymerization initiator and a suspending agent in an aqueous medium in a polymerization vessel, said process comprising providing, as the oil-soluble polymerization initiator, a mixture of (A) t-butyl peroxyneoheptanoate with (B) a perester peroxide other than said t-butyl peroxyneoheptanoate, said perester peroxide being such that a 10-hour half-life period temperature of a benzene solution of said peroxide dissolved in an amount of 0.1 mole per 1 liter of benzene is 44 to 55° C.; and completing the polymerization at a temperature higher than a preset temperature for the polymerization by from 10 to 20° C. when or after the internal pressure of the polymerization vessel begin to drop at the terminal stage of the polymerization reaction. According to this process, it is possible to obtain a vinyl chloride polymer good in quality, particularly with low initial discoloration when processed into formed products, at a good yield in a short period of polymerization time.

8 Claims, No Drawings

POLYMERIZATION OF VINYL CHLORIDE WITH T-BUTYL PEROXYNEOHEPTANOATE AND PERESTER PEROXIDE

BACKGROUND OF THE INVENTION

1. Field of the Invention

The present invention relates particularly to a production process suitable for obtaining a high quality vinyl chloride polymer having a low polymerization degree of an average polymerization degree being 850 or less.

2. Description of the Prior Art

A vinyl chloride polymer is generally produced by subjecting vinyl chloride monomer or a monomeric mixture containing vinyl chloride monomer to suspension polymerization in the presence of an oil-soluble polymerization initiator and a suspending agent in an aqueous medium.

Conventionally in order to improve the yield of the resulting polymer without extending the polymerization time, there have been known a method increasing the amount of an oil-soluble polymerization initiator to be used and a method elevating the temperature of a content present in a polymerization vessel when the polymerization reaction proceeds sufficiently and the internal pressure of the polymerization vessel begins to drop. However, the polymer obtained by such a method has the defect that the polymer becomes yellowish when it is formed into products; that is, the so-called initial discoloration of the formed products may increase. Thus, it is impossible that the conventional methods improves the yield of the resulting polymer as well as keeping the initial discoloration of the formed products at a low level.

SUMMARY OF THE INVENTION

An object of the present invention is to provide a process of producing a vinyl chloride polymer, capable of obtaining a vinyl chloride polymer, of which quality is excellent (for example, formed products with low initial discoloration can be obtained), at a good yield in a short period of polymerization time.

The present invention provides a process of producing a vinyl chloride polymer wherein vinyl chloride monomer or a monomeric mixture containing vinyl chloride monomer is subjected to suspension polymerization in the presence of an oil-soluble polymerization initiator and a suspending agent in an aqueous medium within a polymerization vessel, said process comprising:

providing, as the oil-soluble polymerization initiator, a mixture of:
- (A) t-butyl peroxyneoheptanoate and
- (B) a perester peroxide other than said t-butyl peroxyneoheptanoate, said perester peroxide having a 10-hour half-life period temperature of 44 to 55° C. in the form of a benzene solution in which said peroxide is dissolved in an amount of 0.1 mole per liter of benzene; and completing the polymerization at a temperature higher than a temperature preset for the polymerization by from 10 to 20° C. when or after the internal pressure in the polymerization vessel begins to drop at the terminal stage of the polymerization reaction.

According to the present invention, it is possible to obtain a vinyl chloride polymer good in quality, particularly with low initial discoloration, at a good yield in a short period of polymerization time.

DETAILED DESCRIPTION OF THE PREFERRED EMBODIMENTS

The present invention will now be described in detail below.

Oil-Soluble Polymerization Initiators

The oil-soluble polymerization initiator used in the production process of the present invention is a mixture of t-butyl peroxyneoheptanoate [hereinafter referred to as initiator (A)] of said component (A) with the following perester peroxide (B).

The perester peroxide of said component (B) includes perester peroxides other than said t-butyl peroxyneoheptanoate and has a 10-hour half-life period temperature of 44 to 55° C., preferably 44 to 50° C., in the form of a benzene solution in which said peroxide is dissolved in an amount of 0.1 mole per liter of benzene [hereinafter referred to as initiator (B)]. If the 10-hour half-life period temperature of initiator (B) is too low, since the amount of heat generated at the initial stage of the polymerization is large when a vinyl chloride polymer with a low polymerization degree is produced, a proper removal of the heat from a polymerization vessel becomes difficult If it is too high, since a large amount of a polymerization initiator needs to be added, the quality of the resulting polymer may be lowered to thereby make the initial discoloration of a product formed from the polymer serious and also it is not economical.

Methods for measuring said 10-hour half-life period temperature are known. For examples there is known a method comprising hermetically placing a benzene solution of a perester peroxide, which is to be measured, dissolved in an amount of 0.1 mole per liter of benzene in a vessel, maintaining the solution at a prescribed temperature to decompose the peroxide, and measuring changes in concentration of the peroxide with the lapse of time. Incidentally, where the decomposition reaction of the perester peroxide can be regarded approximately as a first-order reaction, the following equation is established.

$$dX/dt=k(a-x)$$

wherein x denotes the concentration of the peroxide, a denotes the initial concentration of the peroxide, k denotes the decomposition rate constant, and t denotes time. Based on the equation above, the half-life period can be calculated from the following equation:

$$t_{1/2}(\text{half-life period})=(\ln 2)/k.$$

Specific examples of said initiator (B) include t-hexyl peroxyneodecanoate (10-hour half-life period temperature: 44.7° C.; hereinafter, the 10-hour half-life period temperature being likewise shown in the parentheses), t-butyl peroxyneodecanoate (46.5° C.), t-hexyl peroxyneohexanoate (49.7° C.) and t-butyl peroxyneohexanoate (52.1° C.). Among them, particularly preferred is t-butyl peroxyneodecanoate. They may be used singly or in a combination of two or more thereof.

The total amount of the initiator (A) and the initiator (B) to be used is generally 0.02 to 0.12 part by weight, preferably 0.04 to 0.1 part by weight, and more preferably 0.05 to 0.1 part by weight, per 100 parts by weight of said vinyl chloride monomer or monomeric mixture. If the amount used is too large, initial discoloration of the resulting polymer may increase. Further, in that case, since the amount of heat generated at the initial stage of polymerization in which the polymerization conversion ranges from 3 to 30% is large and thus the removal of the heat from a polymerization vessel can not be sufficiently effected, it may become difficult to keep the polymerization temperature constant and, as a result, a vinyl chloride polymer having an intended average polymerization degree may not be obtained. In contrast thereto, even if the amount used is too small, the polymerization time may not be sufficiently shortened.

The mixing ratio of initiator (A) to initiator (B), namely, (A)/(B) is preferably 1/9 to 9/1 by weight, and more preferably 1/5 to 5/1 by weight. If the ratio is too small, the initial discoloration may increase and also the amount of scale deposited on the inside of a polymerization vessel may be increased. Further, in that case, since the amount of heat generated at the initial stage of polymerization in which the polymerization conversion is 3 to 30% is large and thus the removal of the heat from a polymerization vessel can not be sufficiently effected, it may become difficult to keep the polymerization temperature constant and, as a result, a vinyl chloride polymer having an intended average polymerization degree may not be obtained. In contrast thereto, even if the ratio is too large, the initial discoloration may increase and also the amount of scale deposited may be increased.

Methods of charging these oil-soluble polymerization initiators into a polymerization vessel may be known methods such as, for example, a method comprising charging the polymerization initiators in the form of a solution, emulsion or suspension using a suitably selected solvent into a polymerization vessel. Also, the polymerization initiators may be charged into a polymerization vessel, either together with water and a suspending agent or after completing the charging of water and a suspending agent. Further, the polymerization initiators may be pumped into a polymerization vessel after completing the charging of said monomer.

Polymerization Conditions

In the production method of the present invention, the polymerization is completed by keeping the temperature of the content present in the polymerization vessel at a temperature higher than a temperature preset for the polymerization by from 10 to 20° C. at the terminal stage of the polymerization reaction. The temperature preset for the polymerization means a prescribed temperature for effecting the polymerization at which the temperature of the content is kept during the polymerization. The temperature of the content is elevated to the temperature preset for polymerization after charging the content materials into the polymerization vessel. Generally, the temperature preset for the polymerization is preferably 58 to 70° C. The terminal stage of the polymerization reaction means a stage at which the polymerization conversion in the polymerization vessel has reached 62% or more, and preferably 72% or more. In the method of the present invention, the temperature of the content present in the polymerization vessel is elevated at a temperature higher than the temperature preset for the polymerization by from 10 to 20° C. when or after internal pressure in the polymerization vessel begins to drop at the terminal stage of the polymerization reaction. Preferably, the temperature of the content is elevated when or after internal pressure in the polymerization vessel is reduced by 0.2 to 1.5 $kg/cm^2$ (gauge pressure, the same being applied hereinafter), more preferably 0.3 to 1.0 $kg/cm^2$, relative to an average of the internal pressure before the terminal stage, that is, at the stage where polymerization conversion is in the range of 50 to 62%.

If the increase of the temperature is less than 10° C., the yield of the resulting polymer is lowered. In contrast, if the increase is larger than 20° C., the initial discoloration of the resulting polymer increases.

The time required for elevating the polymerization temperature by from 10 to 20° C. as mentioned above is not limited, but may be generally about 2 to 30 minutes, and preferably about 10 to 20 minutes.

The production method of a vinyl chloride polymer according to the present invention can be effected under the same conditions as conventionally used in production methods of a vinyl chloride polymer, except that said oil-soluble polymerization initiators are used and that the polymerization is completed at the time when the temperature of the content present in the polymerization vessel is elevated to a prescribed temperature at the terminal stage of the polymerization reaction. More specifically, the charging of vinyl chloride monomer or a monomeric mixture containing vinyl chloride monomer, a suspending agent and an aqueous medium into a polymerization vessel may be carried out in the same manner as in the conventional methods, and the polymerization conditions at the stages other than the terminal stage may be the same as in the conventional methods.

(Monomer)

The monomer used in the production method of the present invention may be vinyl chloride monomer or a mixture (the amount of vinyl chloride being 50% by weight or more) of vinyl chloride monomer and a monomer copolymerizable therewith. Said comonomers include, for example, vinyl esters such as vinyl acetate and vinyl propionate; acrylic acid esters and methacrylic acid esters, such as methyl (meth)acrylate and ethyl (meth)acrylate; olefins such as ethylene and propylene; vinyl ethers such as lauryl vinyl ether and isobutyl vinyl ether; maleic anhydride; acrylonitrile; styrene; vinylidene chloride; and other monomers copolymerizable with vinyl chloride. These can be used singly or in a combination of two or more thereof.

(Suspending Agent)

The suspending agent may be any one which is conventionally used in suspension polymerization of vinyl chloride or monomeric mixture containing vinyl chloride in an aqueous medium. Such suspending agents include, for example, water-soluble cellulose ethers such as methyl cellulose, hydroxyethyl cellulose, hydroxypropyl cellulose and hydroxypropyl methyl cellulose; water-soluble or oil-soluble partially saponified polyvinyl alcohols; acrylic acid polymers; water-soluble high molecular substances such as gelatin; and oil-soluble emulsifiers such as sorbitan monolaurate, sorbitan trioleate, glycerin tristearate and ethylene oxide/propylene oxide block copolymers. These can be used singly or in a combination of two or more thereof. The amount of the suspending agent used is generally 0.025 to 0.140 part by weight, and preferably 0.03 to 0.07 part by weight, per 100 parts by weight of said monomer or monomeric mixture.

(Aqueous Medium)

Said aqueous medium used includes, for example, deionized water. The amount of the aqueous medium is preferably 90 to 200 parts by weight, and more preferably 90 to 130 parts by weight, per 100 parts by weight of said monomer or monomeric mixture.

(Other Additives)

Further in the production process of a vinyl chloride polymer according to the present invention, there can be optionally added polymerization modifiers, chain transfer agents, pH adjusters, gelation improvers, antistatic agents, crosslinking agents, stabilizers, fillers, antioxidants, buffers, scale preventive agents and the like; which may be optionally used for the production of vinyl chloride polymers. Also, a small amount of surfactants can be added.

(Polymerization)

The method of charging the monomer, the polymerization initiators, the aqueous medium and other materials into a polymerization vessel may be carried out in accordance with the same manner as conventionally known methods for the suspension polymerization of vinyl chloride monomer or monomer mixture containing the same, except for the above otherwise described. Polymerization conditions, and the like, at the stage before the polymerization temperature is raised from the temperature preset for the polymerization by from 10 to 20° C. may be also the same as those of conventionally known methods. The temperature preset for the polymerization may be generally about 40 to 70° C. Particularly when a low molecular weight-vinyl chloride polymer with an average polymerization degree of 850 or less is produced, the polymerization is effected preferably at 58 to 70° C., more preferably at 59 to 68° C. Typical embodiments of the production process according to the present invention are as follows, for example:

First, a suspending agent and an aqueous medium are charged into the polymerization vessel. Then, after the inside of the polymerization vessel is evacuated to form a state of reduced pressure, the oil-soluble polymerization initiators are charged therein to prepare an aqueous suspension. Elevation of the temperature of the aqueous suspension is started while stirring the suspension, followed generally by carrying out polymerization at a prescribed polymerization temperature During the polymerization, optionally, at least one selected from the aqueous medium, the suspending agent, the oil-soluble polymerization initiators and other additives may be added.

In the production process of the present invention, after the materials were charged into the polymerization vessel as mentioned above, the temperature of the content present in the polymerization vessel is elevated to a prescribed temperature (temperature preset for the polymerization). Then, after the temperature of the content in the polymerization vessel has reached the preset temperature for the polymerization, the content is suspension polymerized while keeping the temperature of the content at the preset temperature. Thereafter, at the terminal stage of the polymerization and when, for example, the internal pressure of the polymerization vessel has reduced by 0.2 to 1.5 kg/cm$^2$ (gauge pressure) relative to the internal pressure on average of the polymerization vessel at the stage where the polymerization conversion is in the range of 50 to 62%, the temperature of the content is elevated from the preset temperature by 10 to 20° C. to complete the polymerization reaction. After the polymerization reaction is completed, the unreacted monomer is recovered, and the resulting slurry of polymer is dehydrated and dried to obtain an intended polymer.

EXAMPLES

Now, the present invention is specifically described with reference to Examples and Comparative Examples. However, the present invention is not limited to these Examples. In Examples and Comparative Examples, t-butyl peroxyneoheptanoate (10-hour half-life period temperature: 50° C.) is abbreviated to BPNp, t-butyl peroxyneonedecanoate (10-hour half-life period temperature: 46.5° C.) to BPD, and di-3,5,5-trimethylhexanoylperoxide (10-hour half-life period temperature: 59.5° C.) to THP.

Example 1

870 kg of deionized water, 210 g of a partially saponified polyvinyl alcohol and 140 g of hydroxypropyl methyl cellulose were charged into a jacketed polymerization vessel made of stainless steel having an internal volume of 2.1 m$^3$. Then, after the inside of the polymerization vessel was evacuated to an internal pressure, of 50 mmHg, 730 kg of vinyl chloride monomer was charged therein. Thereafter, oil-soluble polymerization initiators [BPNp/BPD=1/1 (weight ratio)] in an amount of 0.064 weight % based on said monomer was pumped with stirring and simultaneously heated-water was passed through the jacket to start the elevation of the temperature of the content charged into the polymerization vessel. At the time when the temperature of the content present in the polymerization vessel reached 62° C. (preset temperature for the polymerization), cooling water was passed through the jacket to effect the polymerization reaction while keeping the temperature of the content present in the polymerization vessel at 62° C. When 1 hour passed after the start of said elevation of the temperature, 204 g of 2-mercaptoethanol (polymerization modifier) was pumped into the polymerization vessel. Thereafter, the polymerization was continued at 62° C. An average value of the internal pressures of the polymerization vessel while the polymerization conversion changed in the range of 50 to 62% was 9.8 kg/cm$^2$ G. The polymerization was carried out intact, and at the time (polymerization conversion: 76%) when the internal pressure of the polymerization vessel dropped to 9.3 kg/cm$^2$ G, the passing of cooling water through the jacket was stopped. Upon stopping the passing of cooling water through the jacket, the temperature of the content present in the polymerization vessel was elevated (start of elevation of the temperature), and at the time (when 20 minutes passed after the elevation of the temperature was started under the internal pressure of the polymerization vessel being 9.3 kg/cm$^2$ G) when the temperature of the content in the polymerization vessel reached 75° C., the polymerization was stopped. Then, after the unreacted monomer was recovered, the slurry-like reaction product obtained in the polymerization vessel was taken out of the vessel The reaction product was dehydrated and dried to obtain a polymer.

Example 2

A polymer was obtained in the same manner as in Example 1, except that the oil-soluble polymerization initiators [BPNp/BPD=1/1 (weight ratio), the amount used: 0.064 weight % of the monomer] used in Example 1 was replaced with oil-soluble polymerization initiators [BPNp/BPD=1/2 (weight ratio)] in an amount of 0.066 weight % based on the monomer.

Comparative Example 1

A polymer was obtained in the same manner as in Example 2, except that the stopping of cooling water through the jacket at the time (polymerization conversion: 76%) when the internal pressure of the polymerization vessel dropped to 9.3 kg/cm$^2$ G, as mentioned in Example 2, was replaced with that the temperature of the content present in the polymerization vessel was kept at 62° C. intact without stopping the passing of cooling water through the jacket and the polymerization was stopped when 20 minutes passed after the time when the internal pressure of the polymerization vessel dropped to 9.3 kg/cm$^2$ G.

Comparative Example 2

A polymer was obtained in the same manner as in Example 1, except that the oil-soluble polymerization initiators [BPNp/BPD=1/1 (weight ratio); the amount used: 0.064 weight % of the monomer] used in Example 1 was replaced with oil-soluble polymerization initiators [THP/BPD=4/5 (weight ratio)] in an amount of 0.075 weight % based on the monomer.

Comparative Example 3

A polymer was obtained in the same manner as in Comparative Example 1, except that the oil-soluble polymerization initiators [BPNp/BPD=1/2 (weight ratio); the amount used: 0.066 weight % of the monomer] used in Comparative Example 1 was replaced with oil-soluble polymerization initiators [THP/BPD=4/5 (weight ratio)] in an amount of 0.070 weight % based on the monomer.

Evaluation of Polymers

Each of the polymers obtained in Examples and Comparative Examples was evaluated for quality in accordance with the following methods. The results are shown in Table 1.

Average polymerization degree:

The average polymerization degree was measured according to JIS K-6721.

Bulk specific gravity:

The bulk specific gravity was measured according to JIS K-673-21.

Particle size distribution:

The polymer was sieved through each of #60, #100 and #200 sieves according to JIS Z-8801, and the amount (weight %) of the polymer remained thereon and the amount (weight %) of the polymer passed therethrough were weighed.

Initial discoloration:

100 parts by weight of the obtained polymer, 1 part by weight of tin laurate, 0.5 part by weight of a cadmium-based stabilizer (C-100J, produced by Katsuta Kako Co.) and 50 parts by weight of dioctyl phthalate as a plasticizer were mixed and the mixture was blended at 160° C. for 5 minutes using of a two-roll mill. Thereafter, the blend was formed into a sheet having a thickness of 0.8 mm. The sheet was cut into pieces which were placed in layers in a frame having an internal volume of 4 cm×4 cm×1.5 cm (depth). Then, the pieces in the frame were heat-pressed at 160° C. under 65 to 70 kgf/cm$^2$ (6.4 to 6.9 MPa) to prepare a test specimen The test specimen was measured using a Color Meter (manufactured by Nihondenshoku Kogyo Co. Ltd.) for luminosity index (L) and chromaticity (a and b values) in the Hunter's color difference equation described in JIS Z 8730 (1980). The polymer obtained in Example 1 was used as the standard, and in comparison with the standard those obtained in other Examples were Comparative Examples were evaluated with respect to luminosity index (L) and chromaticity (a and b values).

TABLE 1

| | Example 1 | Example 2 | Comparative Example 1 | Comparative Example 2 | Comparative Example 3 |
|---|---|---|---|---|---|
| Oil-soluble polymerization initiators = weight ratio (weight % based on monomer) | BPNp/BPD = 1/1 (0.064) | BPNp/BPD = 1/2 (0.066) | BPNp/BPD = 1/2 (0.066) | THP/BPD = 4/5 (0.075) | THP/BPD = 4/5 (0.070) |
| Polymerization time | 3 hr 58 min | 3 hr 56 min | 4 hr 5 min | 4 hr 7 min | 4 hr 15 min |
| Temperature at terminal stage of polymerization (° C.) | 75 | 75 | 62 | 75 | 62 |
| Average polymerization degree | 690 | 690 | 690 | 690 | 690 |
| Yield (%) | 87 | 87 | 82 | 87 | 82 |
| Bulk specific gravity (g/mL) | 0.561 | 0.563 | 0.560 | 0.562 | 0.561 |
| Particle size distribution (pass %) | | | | | |
| #60 | 100 | 100 | 100 | 100 | 100 |
| #100 | 92.4 | 93.5 | 91.8 | 92.2 | 91.8 |
| #200 | 5.4 | 5.2 | 4.9 | 5.1 | 5.3 |
| Initial discoloration | Standard | Substantially the same as in Example 1 | Substantially the same as in Example 1 | Yellowish stronger than in Example 1 | Yellowish stronger than in Example 1 |

What is claimed is:

1. A process for producing a vinyl chloride polymer, comprising:

(a) polymerizing in suspension vinyl chloride monomer or a monomeric mixture containing vinyl chloride monomer in the presence of an oil-soluble polymerization initiator and a suspending agent in an aqueous medium in a polymerization vessel at a preset temperature for polymerization of 58° C. or more, wherein said oil-soluble polymerization initiator is a mixture of:

(A) t-butyl peroxyneoheptanoate and (B) a perester peroxide other than said t-butyl peroxyneoheptanoate, said perester peroxide having a 10 hour half-life period temperature of 44 to 55° C. in the form of a benzene solution in which said peroxide is dissolved in an amount of 0.1 mole per liter of benzene; and (b) completing the polymerization at a temperature higher than said preset temperature for the polymerization by from 10 to 20° C. when or after the internal pressure in the polymerization vessel begin to drop at the stage where a polymerization conversion has reached 62% or more;

wherein the resulting vinyl chloride polymer has an average polymerization degree of 850 or less.

2. The process according to claim 1, wherein said component (B) is at least one compound selected from the group consisting of t-hexyl peroxyneodecanoate, t-butyl peroxyneodecanoate, t-hexyl peroxyneohexanoate and t-butyl peroxyneohexanoate.

3. The process according to claim 1, wherein the temperature of the content is elevated when or after the internal pressure of the polymerization vessel has dropped by 0.2 to 1.5 kg/cm$^2$ in terms of gauge pressure relative to an average of the internal pressure of the polymerization at the stage where the polymerization conversion is in the range of 50 to 62%.

4. The process according to claim 1, wherein the amount of said mixture of components (A) and (B) is 0.02 to 0.12 parts by weight per 100 parts by weight of the monomer or monomeric mixture, and the weight ratio of component (A)/component (B) in said mixture ranges from 1/9 to 9/1.

5. The process according to claim 1, wherein the amount of said mixture of components (A) and (B) is in the range of 0.04 to 0.1 parts by weight per 100 parts of said vinyl chloride monomer or monomeric mixture.

6. The process according to claim 1, wherein the weight ratio of the initiator (A) to the initiator (B) is in the range of 1/5 to 5/1.

7. The process according to claim 1, wherein the preset temperature for the polymerization is in the range of 58° C. to 70° C.

8. The process according to claim 1, wherein said oil-soluble polymerization initiator consists of the initiator (A) and the initiator (B).

* * * * *